US012765743B2

(12) United States Patent
Fomin et al.

(10) Patent No.: US 12,765,743 B2
(45) Date of Patent: Oct. 20, 2026

(54) METHOD FOR ELECTRONICALLY DOCUMENTING A CLEANING PROCESS

(71) Applicant: Carl Freudenberg KG, Weinheim (DE)

(72) Inventors: Pavel Fomin, Moscow (RU); Manfred Zielbauer, Hirschberg (DE); Mike Kosub, Bruchsal (DE); Theofanis Lambrou, Darmstadt (DE); Andreas Eisenhut, Pullach (DE)

(73) Assignee: CARL FREUDENBERG KG, Weinheim (DE)

( * ) Notice: Subject to any disclaimer, the term of this patent is extended or adjusted under 35 U.S.C. 154(b) by 397 days.

(21) Appl. No.: 18/551,424

(22) PCT Filed: Mar. 26, 2021

(86) PCT No.: PCT/EP2021/057985

§ 371 (c)(1),
(2) Date: Sep. 20, 2023

(87) PCT Pub. No.: WO2022/199849

PCT Pub. Date: Sep. 29, 2022

(65) Prior Publication Data

US 2024/0164616 A1 May 23, 2024

(51) Int. Cl.
*A47L 13/50* (2006.01)
*G06Q 10/0637* (2023.01)
*G06Q 10/0639* (2023.01)

(52) U.S. Cl.
CPC .......... *A47L 13/50* (2013.01); *G06Q 10/0637* (2013.01); *G06Q 10/0639* (2013.01)

(58) Field of Classification Search
CPC A47L 13/50; G06Q 10/0637; G06Q 10/0639; G06Q 10/06398; G06Q 10/087; G06Q 50/10
See application file for complete search history.

(56) References Cited

U.S. PATENT DOCUMENTS

2003/0095826 A1* 5/2003 Policicchio ............. A47L 13/20 401/138
2003/0209263 A1* 11/2003 Bell ........................ A47L 13/44 134/198
2005/0186015 A1* 8/2005 Sacks .................... H04L 67/125 401/139
2006/0140703 A1* 6/2006 Sacks ...................... A47L 13/22 401/139
2006/0279421 A1 12/2006 French et al.
(Continued)

FOREIGN PATENT DOCUMENTS

EP 3095370 A1 11/2016
GB 2500168 A 9/2013
WO WO 2018/019366 A1 2/2018

*Primary Examiner* — Sisay Yacob
(74) *Attorney, Agent, or Firm* — LEYDIG, VOIT & MAYER, LTD.

(57) ABSTRACT

A method for electronically documenting a cleaning process, in which data of the cleaning process is captured and written to an electronic database, the method including capturing preparation data in connection with preparing for the cleaning process, capturing performance data in connection with performing the cleaning process, and capturing post-processing data in connection with following up on the cleaning process.

19 Claims, 3 Drawing Sheets

(56) References Cited

U.S. PATENT DOCUMENTS

| | | | |
|---|---|---|---|
| 2018/0122215 | A1 | 5/2018 | Li et al. |
| 2020/0160259 | A1 | 5/2020 | Paris, Jr. |
| 2020/0241508 | A1 | 7/2020 | Salmon et al. |

* cited by examiner

METHOD FOR ELECTRONICALLY DOCUMENTING A CLEANING PROCESS

CROSS-REFERENCE TO PRIOR APPLICATION

This application is a U.S. National Phase application under 35 U.S.C. § 371 of International Application No. PCT/EP2021/057985, filed on Mar. 26, 2021, and claims benefit to the aforementioned application. The International Application was published in English on Sep. 29, 2022 as WO 2022/199849 A1 under PCT Article 21(2).

FIELD

The invention relates to a method for electronically documenting a cleaning process, in which data of the cleaning process are captured and documented.

BACKGROUND

For quality assurance and traceability of cleaning operations, it is necessary to document the cleaning operation as completely as possible. There is a need for this in particular in hygiene-sensitive facilities such as hospitals. Documenting the cleaning process as comprehensively as possible can open up the possibility of finding the starting point of a contamination in the case of an undesirable spread of germs or the like, and as a result for example changing the cleaning process in such a way that future contaminations from the same source of error are prevented. Further, the documentation can serve the employer as evidence of the cleaning work performed.

Thus far, the cleaning process has been documented predominantly manually. For this purpose, it is known for example for cleaners to document manually on record sheets, which are on display in the rooms to be cleaned, when the room has been cleaned by the cleaner. However, this type of documentation does not allow for any conclusions about the scope and success of the cleaning performed. Further, the information thus captured is not readily accessible.

SUMMARY

In an embodiment, the present disclosure provides a method for electronically documenting a cleaning process, in which data of the cleaning process is captured and written to an electronic database, the method comprising capturing preparation data in connection with preparing for the cleaning process, capturing performance data in connection with performing the cleaning process, and capturing post-processing data in connection with following up on the cleaning process.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
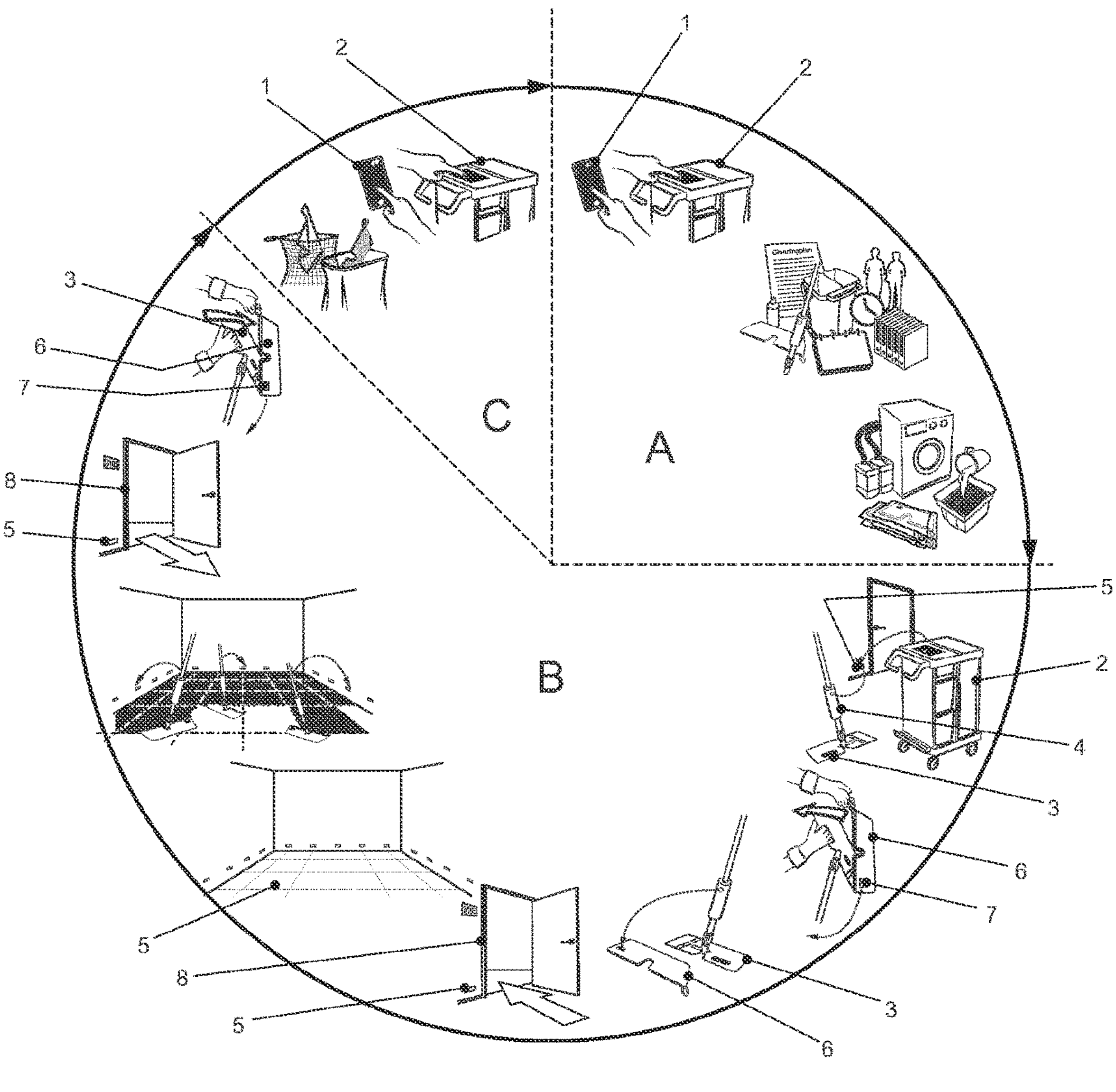
FIG. 1 illustrates a cleaning process, represented as a cleaning cycle.

In an embodiment, the present invention provides a method for documenting a cleaning process in such a way that comprehensive traceability of the cleaning work is possible.

The method according to an embodiment of the invention for electronically documenting a cleaning process, in which data of the cleaning process are captured and written to an electronic database, comprises the following steps:

- capturing preparation data in connection with preparing for the cleaning process,
- capturing performance data in connection with performing the cleaning process,
- capturing post-processing data in connection with the post-processing of the cleaning process.

The method according to an embodiment of the invention makes it possible to capture the entire cleaning cycle of the cleaning operation. A cleaning cycle is initially to be understood to be continually repeating, for example daily, cleaning. According to an embodiment of the invention, however, further cleaning cycles may also be captured, for example in the context of macrocycles which capture cleaning operations, such as window-cleaning, which are to be performed less frequently but still regularly, alongside the repeated daily cleaning. The data are preferably captured during the cleaning process.

As well as the actual cleaning operation, each cleaning cycle, in particular the daily cleaning cycle, also comprises preparatory activities, such as assembling and preparing the cleaning utensils, and also post-processing of the cleaning process, for example returning the cleaning utensils and making mop covers available for machine-washing. As a result, it is possible to capture and document an entire cleaning cycle completely, the cleaning cycle comprising not only the actual cleaning operation but also preparation and post-processing activities. At a later time, it is thus possible to only check the actual cleaning process and the preceding and following activities. This makes it possible to identify possible sources of error within the cleaning cycle both in real time and in retrospect, and to eliminate possible sources of error by changing the cleaning process. This may relate to both the process and the cleaning utensils used.

As a result of the cleaning operations being documented, individual discrepancies in the cleaning process can be detected and adjusted by the relevant cleaning staff, in such a way that, for comparable cleaning tasks, greater consistency in the operations performed is achieved independently of the relevant cleaner.

However, real-time corrections can be made to cleaning processes which are currently being performed. For this purpose, by means of the data of the cleaning process which are currently being detected, discrepancies from the prescribed cleaning process can be detected in real time. The discrepancies can be reported to the cleaner and/or to a control station, and the discrepancies can be corrected on site.

In a control station, the cleaning in a plurality of buildings and the works of a plurality of cleaning staff are coordinated. These buildings may be physically separated, and the cleaning processes may also be temporally offset. In the control station, by accessing the data captured in accordance with embodiments of the invention, the cleaning tasks can be coordinated and optimised promptly and independently of location.

The data of the cleaning process, in other words the preparation data, the performance data and the post-processing data, are captured electronically in an electronic database. In an electronic database, large volumes of data can be stored using simple means and so as to be easily searchable. These data, which are stored for example in a central storage unit such as a server or a cloud system, may be accessed in real time and independently of location via existing communication systems. This enables, for example for the control station, an easy access to the captured data.

The data of the cleaning process can further be used to generate reports on cleaning tasks performed. This is especially helpful, when the cleaning company is requested to monitor and document their cleaning tasks to ensure compliance with agreed cleaning contract or to guarantee a certain hygiene level in hygiene sensitive sites like hospitals or production in controlled environment. The electronically generated reports can be generated in a customised way in e. g. function of time, site, special areas, cleaners and/or used equipment.

The data may be captured either manually, via an input device, or automatically. Automatic data capturing may take place for example by way of devices equipped with transmission means. Devices of this type comprising transmission means are for example electronic access cards for the cleaning staff as well as cleaning trolleys, cleaning devices and cleaning textiles equipped with electronic transmitters.

Further, data on the buildings in which the cleaning operations are being carried out may be stored in the database. This may take place for example in the form of a building topography, in which the location and size of a room to be cleaned and the purpose of use thereof are stored.

The purpose of use of the room to be cleaned may for example give rise to a repeating cleaning task, which varies depending on the usage and setup of the room. Thus, the repeating cleaning operation in an operating theatre of a hospital may differ from that of a patient room.

The steps of preparing, performing and post-processing on the cleaning process may be specified in a cleaning plan. As well as fixed parameters, such as surface area, this plan may also be influenced by situational constraints. Constraints of this type are for example external influencing variables, such as weather, public access, room occupancy, particular hygiene requirements for treating infectious patients. In this context, it is possible to adapt the cleaning plan dynamically to the relevant circumstances in a given building. This may take place in real time and be conveyed to the cleaner immediately.

The cleaning plan may predetermine which cleaning utensils are to be selected for the upcoming cleaning tasks. For example, for the upcoming cleaning of hygiene-sensitive rooms, particular mop covers are selected and will be dosed with a specific cleaning detergent. For the cleaning of rooms with particular requirements on electromagnetic properties, for example in rooms for magnetic resonance tomography, it may be prescribed that exclusively non-magnetic cleaning utensils, such as cleaning trolleys and flat mopping utensils, are selected.

For the preparation data, the date and the time of the start of the preparation for the cleaning process, the cleaner, the cleaning plan, the cleaning locations and/or the cleaning utensils may be recorded.

The cleaner may log in using an ID card or access card, wherein the login process is captured. The cleaner receives a cleaning plan, which includes a specification as to the rooms to be cleaned and the cleaning operations to be performed therein. The cleaning plan preferably additionally contains specifications as to the cleaning utensils to be used for the cleaning tasks and the preparation and post-processing for said utensils. Further, the cleaning plan may contain specifications as to the rooms or locations to be cleaned and the type of cleaning determined for each room or location. For example, the cleaning plan may show that, in a first room, merely a dry floor cleaning, in a second room, a wet floor cleaning using a first cleaning agent, and in a third room, a double floor cleaning using a first cleaning agent and a second cleaning agent are to be carried out. The cleaning plan may also contain rooms or locations which are to be explicitly excluded from a cleaning.

Depending on the cleaning plan, cleaning agents can be assigned to the cleaning utensils in the specified type, quantity and dosage as well as other preparation data important for the cleaning process.

Preferably, the cleaner will receive a mobile electronic device having an input and output option, preferably via a graphical display. The electronic device may be connected to the central electronic database via a wireless network or the like, and receive the cleaning plan and specifications as to the cleaning utensils to be used from the electronic database. These specifications are displayed on the display, and the cleaner compiles the cleaning utensils according to the data displayed on the display. The electronic device may also be arranged on a cleaning trolley, independently of the cleaner.

In this context, the cleaning utensils are equipped to communicate with the electronic device and/or the electronic database. If the selection of cleaning utensils compiled by the cleaner does not match the selection provided in the cleaning plan, this can be signalled to the cleaner either via the cleaning utensils themselves or via the electronic mobile device. In this case, the cleaner may either adapt the cleaning plan or change the selection of cleaning utensils to match the cleaning plan. These discrepancies may also be stored in a central database and thus also be accessible to remote individuals, for example in the control station, in real time.

For the performance data, a record of the cleaner, of the date and of the start time of performing the cleaning process, the room to be cleaned, the cleaning utensils used, including the preparation thereof, the area cleaned during the cleaning process and/or the date and time of the end of performing the cleaning process may be captured.

The cleaner, the date, the start time and start location may be recorded either automatically or by manual input by the cleaner. Automatic capture may happen through for example the electronic device storing a timestamp when the cleaner and cleaning utensils have reached the room to be cleaned, or respectively the entranceway associated with the room to be cleaned. With the cleaning plan and the type of room to be cleaned, it can be signalled to the cleaner via the electronic device which cleaning device and which cleaning mop cover are to be used for the cleaning operation.

By capturing the cleaning utensils, in particular the cleaning textiles, used for cleaning a room, it can be monitored whether unused cleaning textiles will also be used for a further room which is to be cleaned. This aspect is important in particular in a hygiene-sensitive environment. In this environment, it can only be ensured that no germs are carried from one room to another if a cleaning textile is used only once in a single room.

The room to be cleaned and/or the area cleaned and/or the cleaning utensils used during a cleaning process can be captured wirelessly. This enables simple, automatic capture of the room to be cleaned and/or area to be cleaned. In this context, the wireless capture preferably takes place by way of near-field communication, for example using RFID technology.

With regard to an embodiment of the present invention, RFID technology can be used in different items. A first item are RFID transponders (tags), which are passive electronic elements having a unique identification. A second item is an RFID reader, which is an active electronic device provided to read the identification of at least one tag or several tags simultaneously. The RFID reader can be provided with a digital clock in order to add a time stamp to a reading event. The RFID reader can have a unique device identification, so that multiple readers can be operated and monitored separately.

Preferably the tags are fixed in a room to be cleaned. The advantage of using RFID technology with fixed tags is that no further installation except the passive tags is needed on the site. For example, the tags can be installed in the area of the skirting boards. The tags can be flat, small and flexible, and can be the size of a coin or matchbox and can be overpainted.

Further installations such as active electronic elements with own power supply, beacons or a system for triangulation via wireless networks, are not needed. Overall, the use of RFID technology is advantageous as it does not interfere or rely on existing building installations.

In this context, the cleaning utensils may be captured wirelessly. For this purpose, the cleaning utensils are equipped with identification tags which make data exchange possible. In this context, cleaning utensils can be equipped with RFID transponders which are captured by suitable reading devices. Thus, for example, mop covers equipped with an RFID transponder can be detected by a receiver attached to a mopping device. The mop cover is in turn clearly labelled and identifiable with the RFID transponder.

The room to be cleaned and/or the cleaning utensils may be equipped with at least one wirelessly transmitting identification tag. In this context, the room to be cleaned may be equipped with one or more identification tags distributed in the room. Identification tags make wireless detection and identification of the cleaning utensils and of the room to be cleaned possible. RFID transponders for example may serve as identification tags. Depending on the configuration, RFID transponders (RFID tags) are passive transponders and require no auxiliary energy and transmit a unique identification signal when required. This may be received and evaluated by suitable readers. It is thus possible to capture the cleaning used utensil, the cleaned room, and a combination of the used cleaning utensil and the cleaned room.

RFID tags and their identification can be programmed in such a way, that the identification code already carries additional information such as name of the supplier, type of cleaning utensil used, production date and lot code for quality control. Localisation tags can carry information about the site, the floor and/or the room, which is also directly encoded in the identification. The identification is normally an array of numbers and letters, in most cases in hexadecimal code. This array can be separated into segments, the so-called coding scheme, where each segment is assigned to a different type of information. Accordingly, the first section may carry information on the producer, the second section on the type of cleaning utensil used and the third section on the assigned room type where the utensil should be ideally used. The segmentation of the identification makes it possible to extract information directly from the array without the need to filter, combine and compute random arrays to get the required information.

Preferably, the RFID tags and the RFID readers are configured to operate in an ultra-high frequency (UHF) range, i. e. in a frequency band between 850 MHz and 950 MHz. The use of this frequency band allows a distance from an RFID tag to an RFID reader in a range of a few metres, for example of 2 m.

In combination with the captured timestamp, this makes traceability of the cleaning process possible. In this context, the time, the used cleaning utensils and the cleaned room are captured automatically. Further, the cleaner and, depending on how the mop is equipped, the cleaned area can be detected. With these data, it can, at a later time, be concluded whether a cleaning task was performed in accordance with the cleaning plan.

Further, the cleaner can be informed, if the automatic evaluation of the cleaning process results in a cleaning task being carried out incompletely or incorrectly. For this purpose, the cleaner may be informed by an optical or acoustic signal. For example, signalling may take place, if an incorrect room has been cleaned, an incorrect cleaning utensil has been used, or a cleaning textile has been used more than once. The last of these is relevant in particular for mop covers or other cleaning textiles which should only be used for one room each.

If a plurality of identification tags is arranged in the room to be cleaned, the cleaned area can be determined by capturing these identification tags. However, it is also possible to capture the cleaned area with suitable equipment of the mopping device. Depending on the number of identification tags arranged in a room, it is possible to directly calculate the cleaning speed and the movement pattern within the room. The number of identification tags separate the room into sectors. Whenever the RFID reader passes one RFID tag in the room, the assigned room sector can be assessed as being cleaned. The resolution of the recorded area cleaned corresponds directly to the number of RFID tags per room.

In another embodiment, only one RFID room tag can be positioned at the entrance of a room. When the cleaner enters the room, the RFID reader on the cleaning utensils reads the room tag identification and a time stamp is registered. When the user leaves the room, the same RFID room tag is read again and a second time stamp is registered. This indicates how long the cleaner has taken to clean the floor of a room. Deviations from a pre-set time period needed to clean a room can be easily detected and indicated to the cleaner or their supervisor.

The combination of the tag on the cleaning utensils, the tag in the room and time stamp allows to calculate which utensil has been used in which room and at which time. Accordingly, the system can automatically detect, if a mop, after having been used in one room, is used in another room. As this is not intended, the system can notify the cleaner in real time about the necessity to exchange the mop and register this event in the database as an error in the cleaning process. This information can be used by the supervisor to, for example, train the cleaning staff individually on their individual improvement potential relating to the cleaning process.

The data of the RFID tag can further be captured by a mobile RFID reader. In this context, the radio receiver may be arranged on a cleaning device, for example, in the case of a mopping device, fixed to the handle. Further, a mobile device may be equipped with a RFID reader or the cleaner may carry a RFID reader personally. The signals conveyed by the RFID tags can thus be received.

In a further embodiment, the mobile device may be assigned to the cleaning trolley. In this case, the mobile device may also be fixedly installed on the cleaning trolley. In this embodiment, it is advantageous for a cleaning trolley to have more available installation room which can be used for necessary components, for example a radio receiver, wireless communication means and batteries. Further, it is possible to better protect the components against external influences, such as impacts, splashing water, dust and theft.

In a further embodiment, the mobile device can be configured to receive the data received by the RFID reader. For example, the cleaner may carry a mobile device which is configured to receive data received an RFID reader which is fixed on a handle of a wiping device.

Identification tags may be attached to the cleaning devices and cleaning textiles. Likewise, identification tags may be fixed in the rooms of the building in which the cleaning trolley is moved. For example, when a hospital station is being cleaned, the cleaning trolley is merely moved along corridors and hallways but not into the rooms leading away from the hallways. If identification tags are attached in the hallway in the region of the room to be cleaned, the radio receiver detects at where in the building the cleaning trolley is parked while the cleaner is cleaning the room assigned to the respective identification tags.

In a further embodiment, a radio receiver fixedly installed on the cleaning trolley may also be used to record the used cleaning utensils and the duration of use thereof. This can take place by capturing the time at which a cleaning utensil is removed and/or at what time the cleaner departs from the cleaning trolley. A further point in time is captured when the cleaning utensil and/or the cleaner approach the cleaning trolley again. By recording absence, it can also indirectly be checked whether a cleaning textile has been used more than once in a plurality of rooms or whether the detected duration of absence corresponds to the time specified for cleaning a room.

Preferably, the cleaning device, for example a flat mopping device, is equipped to capture the area of the room to be cleaned which is covered by the cleaner. This may happen indirectly, in that the cleaning device calculates the area covered by capturing the duration and the acceleration forces acting on the cleaning device as a result of the cleaning movement. However, the cleaning device may be equipped with communication means or identification tags, which communicate with communication means of the building or of the room to be cleaned in such a way that the area covered by the cleaning device can be captured. This may for example happen through triangulation of the position of the communication means or identification tags with respect to stationary radio receivers or by way of the change in the signal strengths received from the moving identification tags by the stationary radio receivers.

Moreover, for documenting the cleaning process, the state of the room which is to be cleaned in accordance with the cleaning plan may be captured before and/or after the cleaning. In this context, the capturing may happen optically. In this context, a photo or video of the room to be cleaned may be taken before the start of the cleaning operations and/or after the end of the cleaning operations, and to store it in the electronic database. The photo or video may be taken either automatically with the electronic device or manually by the cleaner with the electronic device or by way of another device, for example a smartphone.

As well as the optical capture, further parameters may also document the cleaning state before and/or after the cleaning. Parameters, for this purpose and which can be captured automatically, are for example the gloss level, the coefficient of friction and/or the concentration of adenosine triphosphate (ATP) of the area to be cleaned. The cleaning utensil may be equipped with further sensors for capturing physical or chemical measurement variables, whose measured values permit a conclusion regarding the cleaning process itself. Here, for example, acceleration sensors may be arranged in a handle of a cleaning device, to determine whether the cleaning textile is being moved too quickly or too slowly over an area to be cleaned. Measurements of the air humidity before and after the wet cleaning of a room may be taken, to determine whether the entire area or only a part thereof has been wiped. Further, by measuring the air humidity, it can be determined whether the cleaning textiles were prepared using the correct amount of cleaning detergent.

The electronic device is preferably likewise connected to the electronic database, and the electronic device transmits data for the documentation to the electronic database. After conclusion of the cleaning operations, the time and date are captured again. This may take place in the same way as at the start of the cleaning operation.

In connection with the assembly of cleaning utensils, it is advantageous if cleaning textiles provided for the cleaning are already provided with a cleaning detergent before the start of the cleaning operations. For this purpose, a dosing station may be provided in which cleaning utensils are provided with a cleaning fluid in accordance with the cleaning plan.

One option involves mop covers provided for the cleaning being arranged in a mop bucket, the mop covers having been selected according to the cleaning plan. Using the dosing device, a cleaning detergent can subsequently be dispensed onto the cleaning textiles. This may happen automatically in the dosing device. For this purpose, the dosing device may be set up to communicate with the electronic database. Further, the dosing device may be set up to capture the mop covers and cleaning utensils supplied to the dosing device, and to dispense the cleaning fluid in accordance with the cleaning plan. In this connection, it is particularly advantageous, if the cleaning utensils are equipped with identification tags for electronic communication. These may for example be RFID chips which are fixedly connected to the cleaning utensils.

A further functionality may arise from equipping the cleaning utensils with identification tags. This is advantageous in particular in relation to cleaning textiles which are used in accordance with the pre-dosing method. In pre-dosing, which is usually carried out in a daily rhythm, these process steps are typically carried out: "use during cleaning", "collection of used cleaning textiles and preparation for machine-washing", "disinfecting machine wash", optionally "machine-drying of the washed cleaning textiles", and "preparation for distributing the prepared cleaning textiles on cleaning trolleys". Accordingly, a machine wash and optionally drying of the cleaning textiles are associated with each in-advance pre-dosing. The number of washing and drying cycles carried out over the lifetime of the cleaning textile thus affects the cleaning textile's physical properties; for example, the total weight of the cleaning textile continually decreases, the fibre properties change, and the overall structure of the cleaning textile is negatively influenced by damaged areas, for example loose seams or worn-through areas. If the total number of a cleaning textile's washing and drying cycles so far is known, further information can be passed to the cleaner on this basis, such as dosing amounts or indications for replacement with a new cleaning textile.

In a further embodiment, the dosing device may be assigned to a cleaning trolley on which the cleaning utensils are arranged. In this case, dosing may be carried out immediately before the start of the cleaning operations. In this case, this preferably happens individually in each case and for a cleaning textile selected for the current cleaning process.

In addition, the identification of single mops in combination with the identification of the room to be cleaned can be used to control the correct use of the assigned mop type for a certain room. In a typical patient room, the room containing the patient's bed will be cleaned with one mop type and preferably the assigned cleaning detergent, whereas the adjacent sanitary room will be cleaned with a different mop type and possibly a different cleaning detergent. By combining pre-determined mop type and detergent with the respective room, the system can control and report those combinations and notify the cleaner and the supervisor, if wrong combinations are used.

For the post-processing data, a record of the cleaner, the date, the time and location, the number and type of the returned cleaning utensils and/or the state of the returned cleaning utensils can be captured. The date, the time and location can be captured in the same way as when the preparation data are captured. In regard to the returned cleaning utensils, it may in particular be captured whether the cleaning utensils have been returned in their entirety. For this purpose, the identities of the cleaning utensils may be linked to the identity of the cleaner when they are dispensed and returned. If the cleaning utensils are equipped with electronic identification tags, it can also be captured whether the same cleaning utensils which were dispensed during preparation have also been returned. With the electronic identification tags, the cleaning utensils can also be captured automatically.

Further, the state of the returned cleaning utensils may be captured. This may be done manually in that the cleaner captures damage or the like via the electronic device and saves it in the database. Further, the cleaning utensils may be equipped with electronic identification tags, which also capture how often the cleaning utensils have undergone a machine wash. From the number of machine washes carried out, an indirect conclusion as to the state of the cleaning textiles can be reached. For example, it may be provided that, as described above, a cleaning textile is replaced after a predetermined number of machine washes.

The specification of damage to cleaning utensils, for example damage to a cleaning trolley, may initiate a subsequent repair or replacement process. For this purpose, the database may be set up to output a signal, for example to send a message. This may for example trigger an automatic repeat order.

Furthermore, it is possible to register the location where the preparation and/or post-processing work of the cleaning operation took place. The location information is particularly relevant for large properties with several buildings, because in such properties preparation and post-processing work can take place centrally in each building.

The captured preparation data, performance data and/or post-processing data may be processed into reports. In this context, the report may be created automatically. The reports simplify an evaluation and the traceability of the cleaning process, for example if an infection chain is to be traced in the course of an infection incident. In this context, the evaluation may take place in the form of daily, weekly and monthly reports, in each case including in real time. A plurality of cleaning processes by different cleaners may also be summarised in one report.

The evaluation may also happen in real time, in which case dynamic alteration and adaptation of the cleaning plans is possible.

With the evaluations and reports, cleaning plans may be adapted or modified. Further, with the evaluations, new cleaning plans for new or changed cleaning areas can be simplified or even automatically created. In addition, differences in the systematics and in the quality of individual cleaning sequences of a plurality of cleaners can be determined. With this evaluation, greater consistency in the cleaning sequences can be ensured, for example through targeted training courses for the cleaners.

The evaluations may also serve to document proper performance of the cleaning. A billable cleaning operation may be invoiced using the documentation. In this context, it is made possible to also bill services where it is discernible from the documentation that they have been rendered.

Some embodiments of the method according to the invention are explained in more detail below with reference to the figures. These show, in each case schematically:

FIG. 1 shows a cleaning process, represented as a cleaning cycle. For the purpose of electronically documenting the cleaning process, data of the cleaning process are captured and written to an electronic database. The method of the documentation of the cleaning process comprises the following steps:

- capturing preparation data in connection with preparing for the cleaning process A,
- capturing performance data in connection with performing the cleaning process B,
- capturing post-processing data in connection with following up on the cleaning process C.

For the preparation data A, the date, time and location of the preparation for the cleaning process, the manner of the preparation, the cleaner, the cleaning plan, the cleaning locations and the cleaning utensils are captured. The cleaning plan specifies an assembly of the cleaning utensils to be used. In accordance to the cleaning plan, cleaning detergents are assigned to the cleaning utensils, in particular to the cleaning textiles.

The cleaning utensils comprise a cleaning trolley 2, a mopping device 3 and several mop covers 6. The cleaning plan is provided on an electronic device 1. In the present embodiment, the electronic device 1 is a mobile device with a touchscreen. The mopping device 3 is provided with an RFID reader 4, configured to read RFID tags 5 in the UHF band.

For the performance data B, the name or ID of a cleaner, the date and the start time of performing the cleaning process, the room 8 to be cleaned, the used cleaning utensils, the area cleaned during a cleaning process and the date and time of the end of the cleaning process are captured in a record.

The room 8 to be cleaned and the area cleaned during a cleaning process are captured wirelessly. The room to be cleaned is provided with several RFID tags 5, which can be wirelessly read by the RFID reader 4 fixed on the mopping device 3. Furthermore, the mop covers 6 are also provided with RFID tags 7 so that the cleaning utensils used can be captured wirelessly.

The electronic device 1 is provided to receive data from the RFID reader 4, especially regarding the detected RFID tags 5 and the identification number of the RFID tag 5. The state of the areas of a room 8 to be cleaned according to the cleaning plan is captured before and after the cleaning by means of the electronic device 1.

For the post-processing data C, a record captures the cleaner, the date, the time and location of the post-processing on the cleaning process, the type of the returned cleaning utensils, the number of the returned cleaning utensils and the state of the returned cleaning utensils.

The data captured during preparation A, performance B and post-processing C, are captured electronically in an electronic database. The captured data A, B and C are stored in a central storage unit.

Figure 2:
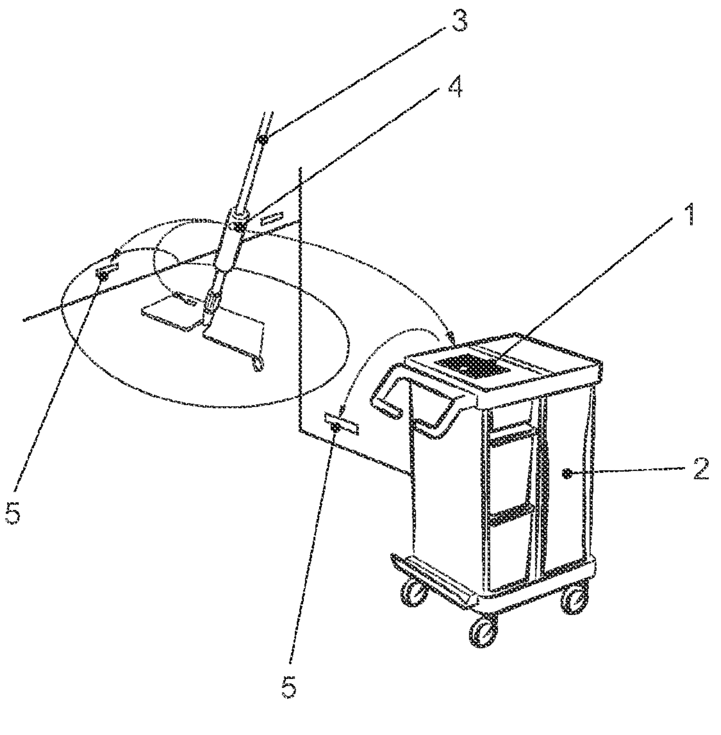
FIG. 2 illustrates a cleaning process using a cleaning cart, a wiping device equipped with an RFID reader and RFID tags fixed in the room to be cleaned.
Figure 3:
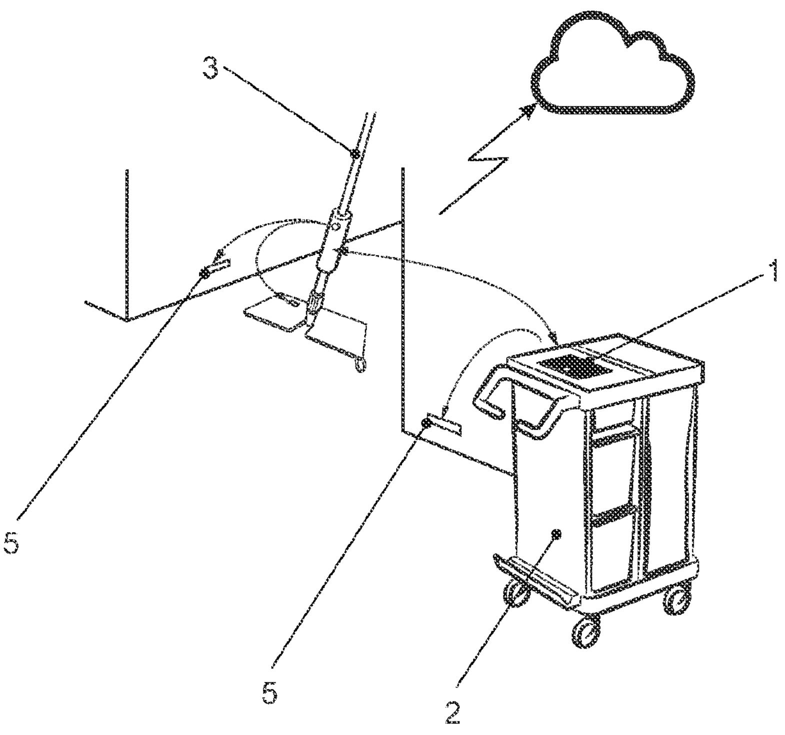
FIG. 3 illustrates the cleaning process as shown in FIG. 2 with a central data storage.

FIGS. 2 and 3 each show a cleaning process of a room 8 to be cleaned. In the present embodiment, several RFID tags 5 are arranged in the room 8 to be cleaned. The RFID tags 5 are fixed to the surrounding wall each with 1 m distance from each other above the skirting board.

Depending on the number of RFID tags 5 arranged in a room, it is possible to directly calculate the cleaning speed and the movement pattern within the room. The number of RFID tags 5 separates the room to be cleaned into sectors. Whenever the RFID reader 4 fixed on the mopping device 3 passes one RFID tag 5 in the room, the assigned room sector can be assessed as being cleaned. The resolution of the recorded area cleaned corresponds directly to the number of RFID tags 5 per room 8.

The combination of the RFID tags 7 on the mop covers 6, the RFID tags 5 in the room 8 and time stamp allows to calculate which utensil has been used in which room and at which time. Accordingly, the system can automatically detect, if a mop cover 6, after having been used in one room, is being used in another room. As this is not intended, the system can notify the cleaner in real time about the necessity to exchange the mop and register this event in the database as an error in the cleaning process. This information can be used by the supervisor to, for example, train the cleaning staff individually on their individual improvement potential relating to the cleaning process.

In an alternative embodiment, only one RFID tag 5 is positioned at the entrance of a room. When the cleaner enters the room, the RFID reader 4 on the mopping device 3 reads the identification number of the RFID tag 5 and a time stamp is registered. When the user leaves the room, the same RFID tag 5 is read again and a second time stamp is registered. The time difference is an indication for the time the cleaner has taken to clean the floor of a room. Deviations from a pre-set time period needed to clean a room can be easily detected and indicated to the cleaner or their supervisor.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for enforcing a cleaning plan, the method comprising:

providing, by a server system to an electronic device associated with a cleaner, an initial cleaning plan that specifies areas to be cleaned, cleaning operations to be performed in the areas for a cleaning process, and a selection of cleaning utensils to be selected for the cleaning operations;

receiving, by the sever system and from the electronic device, preparation data in connection with preparing for the cleaning process, wherein the preparation data includes the cleaning utensils obtained by the cleaner;

receiving, by the server system and from the electronic device, performance data in connection with performing the cleaning process, wherein the performance data is captured at least in part by Radio-Frequency Identification (RFID) transponders of the cleaning utensils and one or more RFID tags associated with the areas to be cleaned and transmitted to the electronic device, and wherein the performance data includes a record of a date and start time of performing the cleaning process, the areas to be cleaned, a selection of the cleaning utensils used, and/or a date and time at an end of performing the cleaning process;

receiving, by the server system and from the electronic device, post-processing data in connection with following up on the cleaning process, wherein the post-processing data is captured at least in part wirelessly by the electronic device; and adapting, by the server system, the initial cleaning plan based on the preparation data, the performance data, and the post-processing data.

2. The computer-implemented method according to claim 1, wherein the preparation data includes a date, time, and location of the preparation for the cleaning process, a manner of the preparation, and/or the cleaner.

3. The computer-implemented method according to claim 2, wherein the cleaning plan specifies an assembly of the cleaning utensils to be used.

4. The computer-implemented method according to claim 2, wherein the cleaning plan is displayed on the electronic device.

5. The computer-implemented method according to claim 2, wherein, in accordance to the cleaning plan, cleaning detergents are assigned to the cleaning utensils, including cleaning textiles.

6. The computer-implemented method according to claim 1, wherein the performance data includes a record of the cleaner, and/or an area of the areas to be cleaned by the cleaning process.

7. The computer-implemented method according to claim 6, wherein the areas to be cleaned and/or the area cleaned by the cleaning process are captured wirelessly.

8. The computer-implemented method according to claim 6, wherein the selection of the cleaning utensils used are captured wirelessly.

9. The computer-implemented method according to claim 7, wherein the areas to be cleaned and/or the cleaning utensils are equipped with at least one identification tag.

10. The computer-implemented method according to claim 9, wherein the areas to be cleaned are equipped with one or more identification tags distributed in the areas.

11. The computer-implemented method according to claim 9, wherein data transmitted by the identification tags are captured by a mobile reader.

12. The computer-implemented method according to claim 11, wherein at least one mobile reader is assigned to a cleaning utensil of the cleaning utensils.

13. The computer-implemented method according to claim 12, wherein the cleaning utensil is a mopping device.

14. The computer-implemented method according to claim 6, wherein a state of the areas which are to be cleaned according to the cleaning plan are captured before and/or after the cleaning, by the electronic device or by a further electronic device.

15. The computer-implemented method according to claim 1, wherein the post-processing data includes, a record of a cleaner, date, time, and location of the post-processing on the cleaning process, a type of returned cleaning utensils, a number of the returned cleaning utensils and/or a state of the returned cleaning utensils.

16. The computer-implemented method according to claim 4, wherein the electronic device is fixed to a cleaning utensil of the cleaning utensils.

17. The computer-implemented method according to claim 1, wherein the preparation data, the performance data, and the post-processing data, are captured electronically in an electronic database.

18. The computer-implemented method according to claim 17, wherein the captured data is stored in a central storage unit.

19. The computer-implemented method according to claim 1, further comprising storing, by the electronic device, a timestamp representing the start time of performing the cleaning process based on an interaction between the electronic device, the RFID transponders of the cleaning utensils, and the one or more RFID tags associated with the areas to be cleaned.

* * * * *